May 1, 1934. J. J. APPEL 1,957,126
TIRE JACK
Filed Aug. 29, 1932
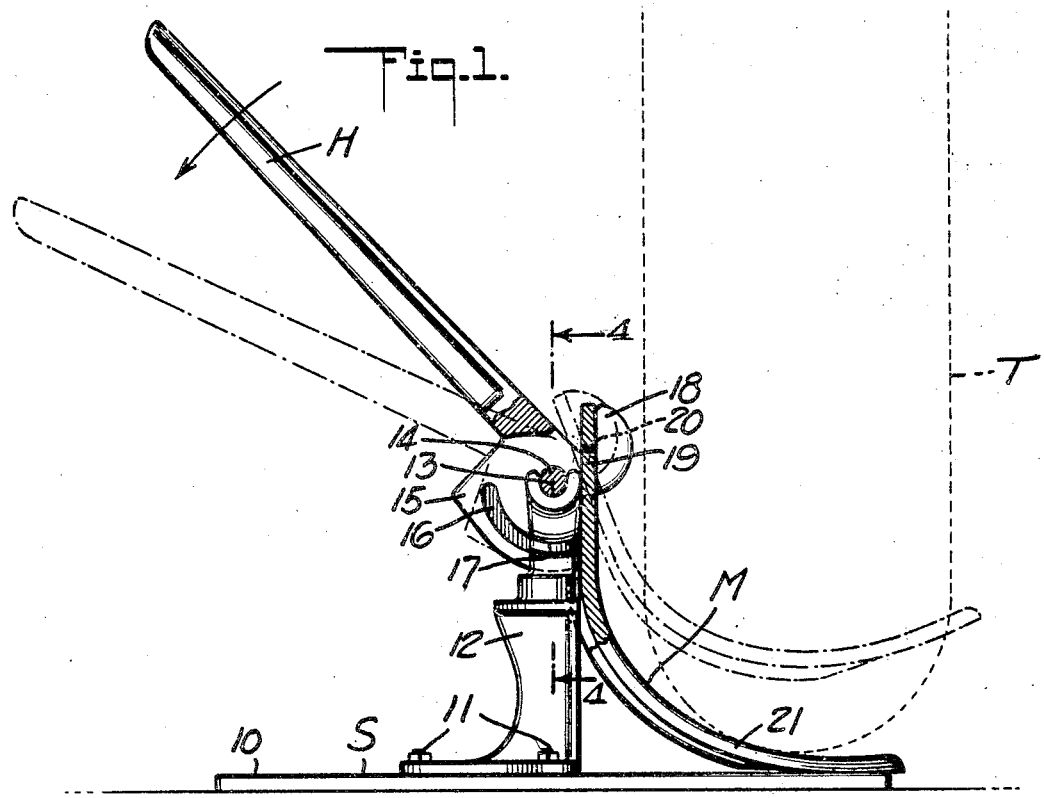
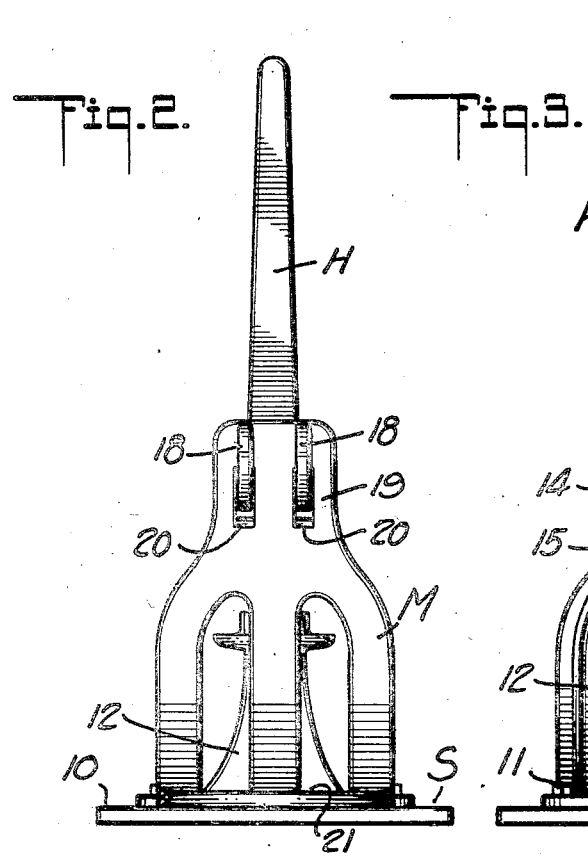
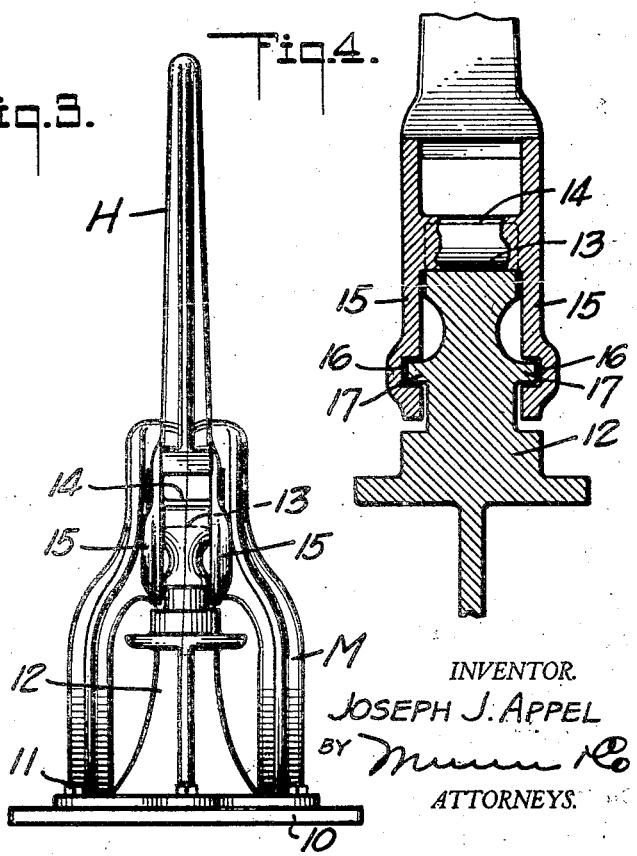
INVENTOR.
JOSEPH J. APPEL
BY *Munn & Co*
ATTORNEYS.

Patented May 1, 1934

1,957,126

UNITED STATES PATENT OFFICE 1,957,126

TIRE JACK

Joseph J. Appel, Red Mountain, Calif.

Application August 29, 1932, Serial No. 630,913

6 Claims. (Cl. 254—131)

This invention relates to and has for a purpose the provision of a jack by which relatively heavy and cumbersome tires, such as are employed on trucks, trailers and busses, can be easily handled and manipulated when mounting and dismounting such tires, all in a manner to obviate the necessity for the operator to directly lift the tire onto or from a wheel of the vehicle, whereby to greatly facilitate the tire changing operation by relieving the operator of the most laborious part thereof.

It is a further purpose of this invention to provide a tire jack of the above described character which is of simple and compact construction and is composed of but a few parts capable of being easily assembled and disassembled without the use of tools, to the end of enabling the parts of the jack to be stored in a small space.

Only one form of the invention will be described, following which its novel features will be pointed out in claims.

In the accompanying drawing:

Figure 1 is a view showing in side elevation, partly broken away, one form of tire jack embodying this invention;

Figure 2 is a view of the tire jack in front elevation;

Figure 3 is a view of the tire jack in rear elevation;

Figure 4 is an enlarged fragmentary sectional view taken on the line 4—4 of Figure 1.

Referring specifically to the drawing, wherein similar reference characters designate similar parts in each of the several views, this invention comprises a support S including a rectangular base 10 to which is secured by bolts 11 a standard 12, the upper end of which is bifurcated to form a substantially semi-circular recess 13 in which is adapted to seat a pivot pin 14 rigidly fixed to the spaced apart cheek pieces 15—15 formed on one end of a handle H and capable of freely receiving the upper portion of the standard therebetween so as to mount the handle on the support for rocking movement about the axis of the pin.

The cheek pieces 15—15 are provided in their confronting faces with arcuate grooves 16—16 concentric with the axis of the pin 14 and adapted to freely receive arcuate tongues 17—17 projecting from opposite sides of the standard as clearly shown in Figure 4. The tongues and grooves coact to prevent accidental unseating of the pin 14 from the recess 13 during the use of the jack, yet permit the handle to be readily disconnected from the support by swinging the handle in a direction reverse to that of the arrow in Figure 1, until the open end of the grooves 16 clears the respective tongues 17, following which the pin 14 can be cleared from the recess 13 by lifting the handle vertically.

From the cheek pieces 15—15 project spaced apart hooks 18—18 by which a tire engaging member M is adapted to be detachably connected to the handle for rocking movement thereby. For this purpose the rectilinear portion 19 of the member is provided with slots 20—20 receiving the hooks as shown in Figure 2 so that the member can abut the cheek pieces 15—15 while the forward and rounded end of the curved portion 21 of the member rests upon the base 10.

Assuming that the three parts of the jack are assembled and are occupying the positions shown in Figure 1, a tire T such as shown in broken lines in this figure can be readily rolled onto the curved portion or crade 21 of the member M, following which the tire can be easily elevated by depressing the handle H, due to the leverage provided by the latter. It will thus be clear that with the jack positioned alongside a jacked up vehicle wheel on which a tire is to be mounted, that the tire can be readily elevated to the height necessary to enable it to be pushed onto the wheel, it being understood that the tire is maintained in a vertical position by one hand of the operator as the other hand or a foot of the operator depresses the handle H. The removal of the tire from the wheel can be accomplished with equal facility; and it will be clear that the parts of the jack, when disassembled, can be stored in a relatively small space.

I claim:

1. A tire jack comprising a baseplate having a standard provided with a bifurcated portion defining an upwardly opening recess; a handle having a pin seating in said recess to mount the handle for rocking movement on the standard; coacting means on the support and handle for confining the pin against displacement from the recess while rendering the handle free to be rocked; and a tire engaging member connected to the handle in a position to rest upon the base plate when the handle is elevated.

2. A tire jack comprising a support having a bifurcated portion defining an upwardly opening recess; a handle having a pin seating in said recess to mount the handle for rocking movement on the support, the support and handle having coacting tongues and grooves for confining the pin against displacement from the recess; and a tire engaging member connected to the handle for movement thereby.

3. A tire jack comprising a base having a standard provided with an upwardly opening recess; a handle having spaced apart cheek pieces and a pin spanning the latter to seat in said recess while the cheek pieces receive the standard therebetween; and a tire engaging member connected to the handle for movement thereby.

4. A tire jack comprising a base having a standard provided with an upwardly opening recess; a handle having spaced apart cheek pieces and a pin spanning the latter to seat in said recess while the cheek pieces receive the standard therebetween; spaced apart hooks projecting from the handle; and a tire engaging member having slots receiving the hooks to detachably connect the member to the handle for movement thereby.

5. A tire jack comprising a base having a standard provided with an upwardly opening recess; a handle having spaced apart cheek pieces and a pin spanning the latter to seat in said recess while the cheek pieces receive the standard therebetween, the standard and cheek pieces having coacting tongues and grooves for confining the pin against displacement from the recess; hooks projecting from the cheek pieces; and a tire engaging member having slots receiving the hooks to detachably connect the member to the handle for movement thereby.

6. A tire jack comprising a support having a recess; a handle having a pin seating in the recess to mount the handle for rocking movement on the support; means for confining the pin against radial displacement from the recess yet rendering the pin free to be disengaged radially from the recess when the handle is rocked to a predetermined position; and a tire engaging member connected to the handle.

JOSEPH J. APPEL.